Oct. 13, 1970   R. L. GODIN ETAL   3,533,635
PRESSURE CONTROLLED SHAFT SEAL INJECTION SYSTEM
Filed May 10, 1968

INVENTORS
RUSSELL L. GODIN
GEORGE T. MORRISSY

*Peter J. Murphy*
ATTORNEY

United States Patent Office 3,533,635
Patented Oct. 13, 1970

3,533,635
PRESSURE CONTROLLED SHAFT SEAL INJECTION SYSTEM
Russell L. Godin, Long Beach, and George T. Morrissy, South Gate, Calif., assignors to Dresser Industries, Inc., Dallas, Tex., a corporation of Delaware
Filed May 10, 1968, Ser. No. 728,238
Int. Cl. F16j 15/00, 15/40
U.S. Cl. 277—3                                        11 Claims

ABSTRACT OF THE DISCLOSURE

An injection system for controlling the flow of liquid through a floating ring liquid seal for the shaft of a liquid pump. The seal includes inboard and outboard sealing rings axially separated by a circulation spacer defining an entrance chamber for the injection liquid. The pressure of the liquid flowing through the seal is detected at two points: (1) the point where the liquid enters the seal and (2) the inboard end of the seal assembly which is effectively the pressure of the chamber adjacent the inboard end of the seal assembly. In order to determine the direction of flow of liquid between the inboard end of the seal assembly and the injection liquid entrance chamber, these two detected pressures are transmitted to a differential pressure controller. This controller produces a pressure signal responsive to the differential pressure to control a flow valve in the injection liquid line. The valve either increases or retards the flow of injection liquid into the seal in response to changes in the pressure differential.

BACKGROUND OF THE INVENTION

This invention is concerned with a system for controlling the flow of injection liquid through a floating ring liquid seal to assure either no-flow or limited controlled flow between the seal liquid injection chamber and the pump chamber at the inboard end of the seal assembly. Such seals are employed for example in centrifugal boiler feed pumps; one seal being employed at the suction end to seal the pump suction or inlet chamber, and another being employed at the discharge end to provide a seal between the leakage collection chamber for the pressure reducing piston or sleeve and the pump exterior. It is particularly desirable during plant start-up, and for a period following plant start-up, to prevent the flow of the pumped liquid outwardly through the floating ring seals in order to assure that damaging fines commonly found in new piping systems are not carried into the seal rings. To permit contaminated liquid to flow through the seal rings, of course, would result in premature failure of this type seal. In some pump systems it may be desirable to have substantially no flow through the liquid seal. In other pump systems it may be desirable to have some flow; and it is particularly desirable to be able to accurately control the amount of flow and the direction of flow. In boiler feed pumps, for example, it may be desirable to limit the flow of hot pumped liquid through the seal to prevent flashing of the liquid. Also, it is desirable to control the flow to eliminate heat losses, for example, and to minimize the contamination of the pumped liquid in cases where it is desirable or necessary to prevent outward flow of the pumped liquid and, therefore, to provide controlled flow of injection liquid into the pump chamber.

It is an object of this invention to provide a novel, effective and uncomplicated system for controlling the flow of injection liquid through a liquid seal for a rotating shaft.

SUMMARY OF THE INVENTION

A liquid injection system according to the invention includes conduit means for supplying injection liquid under pressure to the liquid seal outboard of one or more sealing rings. A pressure-responsive flow control valve in the injection liquid conduit controls the flow of liquid into the seal. A pressure signal for controlling the pressure-responsive flow control valve is provided by a differential pressure controller which is responsive to pressures detected at the seal injection chamber and at the inboard end of the seal assembly. By controlling the pressure at the injection chamber in relation to the pressure at the inboard end (pump chamber), flow past the inboard seal rings may be controlled to be inwardly into the pump, outwardly out of the pump, or essentially static.

BRIEF DESCRIPTION OF THE DRAWING

The invention is illustrated by way of example in the accompanying drawing in which.

DESCRIPTION OF THE PREFERRED EMBODIMENT

Figure 1:
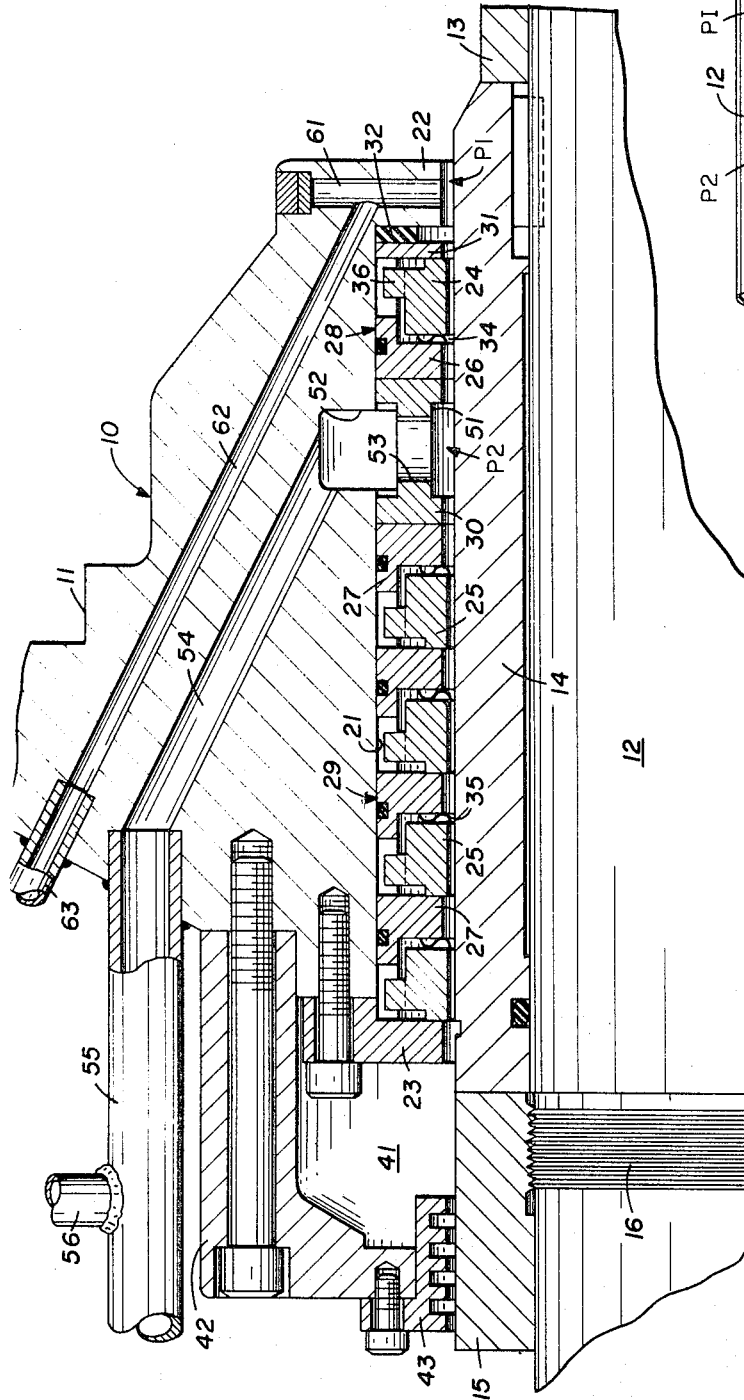
FIG. 1 is a diagrammatic fragmentary sectional view of the suction end of a centrifugal pump showing a floating ring liquid shaft seal and associated structure.

In FIG. 1, there is shown a portion of the structure at the suction end of a centrifugal boiler feed pump, for example, the principal element of the illustrated structure being a seal housing 10 which is supported within the pump case end wall and accommodates the shaft seal between the pump suction chamber and the pump exterior. This seal housing is provided with a shoulder 11 which may be received in a suitable opening in the pump case end wall, for example; and the housing may be secured to the end wall in any suitable manner. As viewed in FIG. 1, the inboard end of the housing 10 is at the right and defines a portion of the pump suction chamber. The shaft 12 which passes through the housing would support one or more pump impellers immediately to the right of the illustrated portion; and a shaft supporting bearing may be provided immediately to the left of the illustrated structure.

Referring to the shaft 12 and its associated structure, there is shown at the inboard end a spacer sleeve 13 which may serve as a spacer between the shaft sleeve 14 and the first stage pump impeller which is rotatably fixed to the shaft to communicate with the pump suction chamber. The shaft sleeve 14, which is a part of the liquid seal assembly, is nonrotatably fixed to the shaft by means of a suitable key. A compression nut 15 threaded on a threaded portion 16 of the shaft 12 abuts the outboard end of the shaft sleeve 14 to axially confine the assembly of the shaft sleeve 14, spacer sleeve 13, and pump impellers (not shown).

The housing 10 defines an axially elongated cylindrical chamber 21 for the rotationably fixed elements of the liquid seal assembly; this chamber being defined by an inwardly extending lip or flange 22 at the inboard end of the housing and a seal ring gland 23 secured to the outboard end of the housing by suitable cap screws. A plurality of annular seal rings 24 and 25 are accommodated in respective annular seal ring grooves defined principally by respective seal ring retainers 26 and 27. The seal assembly consists of an inboard section 28 defined by the retainer 26 and seal ring 24, and an outboard section 29 consisting of four axially stacked seal ring assemblies each defined by a retainer 27 and a seal ring 25. The inboard and outboard sections are separated by an annular circulation spacer 30 through which the injection liquid enters the seal assembly.

The seal ring retainers 26 and 27 are cup shaped annular members, each including an axially extending peripheral lip which defines the outer wall of the respective seal ring groove; and these peripheral lips engage the adjacent ring retainer or other member to define the seal ring groove. Referring to the inboard section 28 of the seal assembly, the retainer 26 and a seal washer 31 define the groove for the seal ring 24; and the seal washer 31 is separated from the housing lip 22 by a makeup gasket 32. The seal ring 24 is essentially rectangular in cross section; however, it is provided with an axially extending annular lip at the inner wall of the ring which engages the seal washer 31. The abutting surfaces of this sealing lip and the seal washer are lapped so that liquid may not flow radially between these surfaces when the seal ring is urged into engagement with the seal washer. A biasing spring 34 is positioned between the outboard wall of the seal ring 24 and the inboard wall of the retainer 26 to normally urge the seal ring into engagement with the seal washer 31. The peripheral lip portion of the retainer 26 is provided with one or more suitable radial openings to accommodate one or more respective radially extending bosses 36 on the seal ring 24, by means of which the seal ring is rotationally confined within the retainer. With the above described structure, the seal ring 24 may float radially, with movements of the shaft, relative to the structure defining the ring retaining groove, while the lapped surfaces of the ring and seal washer maintain an effective liquid seal. The inner diameter of the seal ring 24, and also the seal rings 25, is slightly larger than the outer diameter of the shaft sleeve 14 to provide a close but freely rotatable fit, which permits the flow of the injection liquid between the mating surfaces of the sleeve and seal rings. The injection liquid then defines a bearing layer between the shaft sleeve and seal rings, which effects the radial movements of the seal rings along with the shaft relative to the other rotationally fixed elements of the seal assembly, which provides lubrication between the shaft sleeve and seal rings, and which prevents the flow of other than the desired liquid through the seal assembly.

The four seal ring assemblies which comprise the outboard section 29 of the seal assembly are essentially identical in structure to the above described seal assembly of the inboard section 28. The axially stacked retainer rings 25 define the seal ring grooves, with the outboard wall of the outboard groove being defined by the seal ring gland 23. The seal rings 25 of the outboard section 29 are urged by respective biasing springs in an outward direction against the respective groove walls. The liquid flow in the outboard section is outward from the circulation spacer 30 to the outboard end of the seal assembly; and the differential pressure producing this liquid flow urges the seal rings 25 outwardly against the inward facing walls of the respective seal ring grooves to maintain the seal between the radial sealing surfaces of the seal ring lips and groove walls.

As above mentioned, a seal ring assembly comprising the inboard section 28 is oriented for a flow of liquid from the circulation spacer 30 inwardly to the inboard end of the seal assembly. Of course, this inboard section could be oriented in reverse direction, if it were desired to have the pump liquid flow outwardly from the pump suction chamber towards the circulation spacer. Alternatively, the inboard seal assembly which comprises the inboard section 28 could be designed to accommodate liquid flow in either direction. U.S. Pat. 3,377,073 issued Apr. 9, 1968 describes a seal assembly similar to that described herein, wherein the seal ring assembly which defines the inboard section functions to provide effective sealing for liquid flow through the seal ring assembly in either direction.

At the outboard end of the seal housing 10 is a structure defining a leakage collection chamber 41 which communicates with the outboard end of the above-described seal assembly to collect the liquid flowing from the seal assembly, for suitable disposal. This structure consists of a leakage housing 42 which is an annular cup shaped member secured to the outboard wall of the seal housing 10 by means of suitable cap screws. An annular leakage housing baffle 43 is secured to the inner periphery of the leakage housing 42 and provides a labyrinth seal cooperating with the outer surface of the compression nut 15 to seal the leakage chamber 41 with respect to the exterior of the leakage housing.

Referring now to the structure through which the injection liquid enters the seal, the inner wall of the circulation spacer 30 is provided with an annular groove 51 which defines an entrance chamber for the injection liquid. The circulation spacer 30 is axially located to communicate with an internal annular groove 52 in the seal housing 10; and the grooves 51 and 52 are communicated by circumferentially spaced radial passages 53 in the circulation spacer 30. Injection liquid is supplied to the housing groove 52 through a passage 54 in the housing 10, which in turn communicates with a conduit 55 secured to the housing by welding or any other suitable means. A branch conduit 56 is connected to the conduit 55 in any suitable manner, such as by welding.

A radial passage 61 is provided at the inboard end of the seal housing 10, extending inwardly through the lip 22 to communicate with the clearance space between the lip 22 and the shaft sleeve 14. This passage 61 is provided for detecting the pressure of the liquid flowing through the seal assembly at this point; and the radial passage 61 is closed at its outer end and communicates with a lateral passage 62 which in turn communicates with a conduit 63 secured to the bushing by any suitable means, such as by welding.

Figure 2:
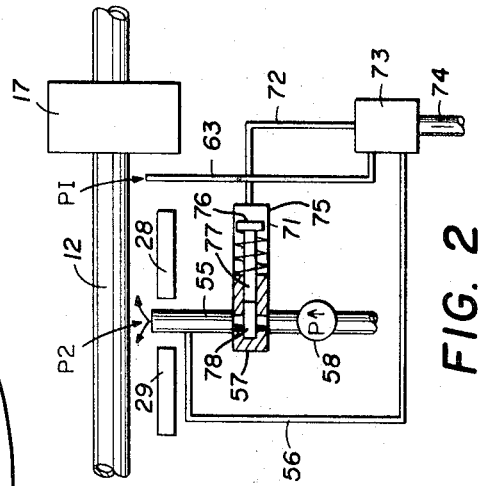
FIG. 2 is a schematic view of an injection fluid control system for the pump of FIG. 1.

FIG. 2 illustrates diagrammatically a system for controlling the flow of injection liquid into the above described seal assembly. In this figure there are diagrammatic showings of the impeller shaft 12 and attached impeller 17, and of the inboard and outboard sections 28 and 29 respectively of the injection seal assembly. There is also a showing of the injection liquid conduit 55 which represents the entrance structure including the entrance chamber 51 through which the injection liquid enters the seal assembly between the inboard and outboard seal sections 28 and 29. In the conduit 55 there is provided a throttle or flow control valve 57, which controls the flow of injection liquid into the seal assembly from a suitable pressurized liquid source represented by a pump 58 in the conduit 55.

The flow control valve 57 is controlled by a pressure responsive actuator 71 represented by a fluid motor including a cylinder 75 and piston 76, the piston rod 77 being operatively connected to a valve closure member 78 in a manner such that the valve closure member 78 is moved between the fully opened or fully closed positions in response to respective reciprocating movements of the piston 76. The piston 76 of the actuator 71 is shown as being urged in one direction by a spring and subject to being urged in the opposite direction by the pressure within the cylinder chamber. The valve 57 and valve actuator 71 represent any type of control valve and associated pressure responsive valve actuator, such as a Type 657 or 667 Diaphragm Actuators manufactured by the Fisher Governor Company of Marshaltown, Iowa. The valve actuator may also include a mechanism which defines a pressure amplifier such as a Series 3560 V/P Valve Positioner also manufactured by the Fisher Governor Company.

The conduit 72 communicates the pressure chamber of the actuator 71 with a differential pressure controller 73 which provides the controlling pressure signal to the valve actuator 71. This controller 73 provides a pressure signal which is responsive to the differential pressure between points P1 and P2 of the seal assembly. The points P1 and P2 are indicated in both FIGS. 1 and 2. The pressure point P1 is at the inboard end of the seal assembly; and this pressure is detected by means of the passage 61 in the seal housing lip 22. The pressure detected at the point P1 is communicated with the differential pressure controller by means of the passage 62 and conduit 63, all represented by the conduit 63 in FIG. 2. The pressure point P2 is at the injection fluid entrance chamber 51; however, this pressure is detected by means of the conduit 56 which branches from the injection liquid conduit 55, the pressure at this point being the same as that in the entrance chamber 51. The conduit 56 then communicates the pressure at the entrance chamber 51 to the differential pressure controller 73. The differential pressure controller communicates with a source of pressurized air through a conduit 74, and the supply air may be modulated by movements of a controller responsive to the differential pressures in the conduits 56 and 63 to produce a responsive pressure signal in the conduit 72 and the actuator 71. An example of a differential pressure controller 73 is a Model 336 Controller manufactured by Controls and Instruments, a division of International Telephone and Telegraph Corporation, Monterey Park, Calif.

The above described form of liquid seal is particularly useful in a boiler feed pump during plant startup and the period immediately following. During startup, there are inherently abrasive fines in the pumped liquid which, if permitted to flow through the shaft seals, would result in premature breakdown and failure of such seals. It is desirable, then, to absolutely prevent any flow of pumped liquid outwardly from the pump chambers through the seals. Such outward flow may be prevented by maintaining the injection liquid pressure P2, at the entrance chamber slightly higher than the pressure P1 at the inboard end of the seal assembly, which pressure P1 corresponds to the pressure within the pump suction chamber as above described. This, of course, would effect the inward flow of injection liquid from the entrance chamber 51 to the pump suction chamber at the inboard end of the seal; and the amount of liquid flow into the pump chamber is controlled by the magnitude of the pressure differential and by the clearance space between the seal ring 24 and the shaft sleeve 14. The pressure P2 at the injection liquid entrance chamber 51 will normally be higher than that in the collection chamber 41, so that the flow of liquid will always be outward from the chamber 51 to the chamber 41. The amount of outward flow through the outboard seal section 29 will again be determined by the magnitude of the pressure differential and the clearance space between the seal rings 25 and the shaft sleeve 14.

Assuming the desired inward flow through the inboard section 28 from the entrance chamber 51 to the pump suction chamber, the injection fluid pressure P2 is maintained slightly higher than the pump suction chamber pressure P1. The differential pressure controller 73, then, might be connected in the system to produce a pressure signal increase in the conduit 72 when the pressure P2 decreases relative to pressure P1, with the effect that the valve actuator 71 would open the valve 57 to increase the flow of injection liquid to the entrance chamber 51 and therefore increase the pressure at the point P2. By the same token, if the injection pressure P2 should increase relative to the suction pressure P1, the pressure signal in the conduit 72 would be decreased to effect a throttling of the injection liquid flow at the valve 57 by the actuator 71. This, of course, would have the effect of decreasing the pressure at the point P2. If it were desired to provide a flow of the pump liquid outward from the pump chamber toward the entrance chamber 51, the pressure P2 could be maintained by the described control assembly at a fixed differential lower than the pressure P1 to provide for such controlled flow.

What has been described is a novel injection control system for a floating ring liquid shaft seal which is effective, easy to understand by those charged with the operation and maintenance of the pump system, and easy to maintain.

The embodiments of the invention in which an exclusive property or privilege is claimed are defined as follows:

1. A liquid injection system for a shaft seal which includes one or more annular seal rings having a close but freely rotatable fit on the shaft to provide controlled leakage therebetween:
   conduit means for supplying injection liquid under pressure to said seal outboard of one or more of said seal rings; a flow control valve in said conduit means for controlling the flow of injection liquid to said liquid seal; a pressure responsive actuator for said control valve;
   a differential pressure controller for providing a pressure signal to said pressure responsive actuator; a first pressure sensor for transmitting to said controller the pressure of the liquid at the inboard end of said seal; a second pressure sensor for transmitting to said controller the pressure of injection liquid entering said seal; and said controller providing a pressure signal to said valve actuator responsive to the difference in pressure sensed by said first and second pressure sensors.

2. A liquid injection system as set forth in claim 1 said first pressure sensor comprising first pressure transmitting conduit means communicating at one end with said shaft at the inboard end of said seal, and communicating at the other end with said differential pressure controller; and said second pressure sensor comprising second pressure transmitting conduit means communicating at one end with said injection liquid conduit means adjacent to said seal, and communicating at the other end with said differential pressure controller.

3. A liquid injection system as set forth in claim 1 said flow control valve being controlled to increase the flow of injection liquid in response to a decrease in the magnitude of said pressure signal, and to decrease the flow of injection liquid in response to an increase in the magnitude of said pressure signal;
   and said differential pressure controller acting to decrease said pressure signal in response to a decrease in the pressure detected by said second pressure sensor relative to the pressure detected by said first pressure sensor, and said controller acting to increase said pressure signal in response to an increase in the pressure detected by second pressure sensor relative to the pressure detected by said first pressure sensor.

4. A liquid injection system as set forth in claim 1 said controller providing a pressure signal to said valve actuator which is responsive to the pressure detected by said second pressure sensor relative to the pressure detected by said first pressure sensor.

5. A liquid injection system as set forth in claim 1 wherein said flow control valve includes a closure member selectively positionable between limiting fully closed and fully opened positions; spring means for urging said closure member toward one of said limiting positions and pressure surface means responsive to the pressure signal for urging said closure member to the other of said limiting positions.

6. In combination with a liquid pump including a housing; a rotatable impeller shaft; and a liquid seal between said housing and shaft comprising one or more annular seal rings having a close but freely rotatable fit on the shaft to provide controlled leakage therebetween:
   a liquid injection system for said seal comprising conduit means for supplying injection liquid under pressure to said seal outboard of one or more of said seal rings; a flow control valve in said conduit for controlling the flow of injection liquid to said seal;

a pressure responsive actuator for said flow control valve;

a differential pressure controller for providing a pressure signal to said pressure responsive actuator; a first pressure sensor for transmitting to said controller the pressure of the liquid at the inboard end of said seal; a second pressure sensor for transmitting to said controller the pressure of injection liquid entering said fluid seal; and said controller providing a pressure signal to said valve actuator responsive to the difference in pressures sensed by said first and second pressure sensors.

7. The combination set forth in claim 6 said first pressure sensor comprising first pressure transmitting conduit means communicating at one end with the liquid chamber adjacent to the inboard end of said seal, and communicating at the other end with said differential pressure controller; said second pressure sensor comprising pressure transmitting conduit means communicating at one end with said liquid injection conduit means adjacent to said seal, and at the other end with said differential pressure control.

8. The combination set forth in claim 6 said liquid seal comprising one or more annular seal rings defining an inboard seal section, and one or more annular seal rings defining an outboard seal section;

and said liquid injection conduit means supplying injection liquid to said seal intermediate said inboard and said outboard seal sections.

9. The combination set forth in claim 6 said first pressure sensor comprising a radially directed passage in the seal housing; said passage communicating with the leakage path between the seal assembly and said shaft immediately adjacent to the inboard end of said seal.

10. The combination set forth in claim 6 said flow control valve including a closure member positionable between a limiting fully closed position and a limiting fully opened position; spring means for urging said valve closure member to one of said limiting positions; said valve actuator including pressure surface means responsive to said pressure signal to urge said valve closure member to the other limiting position.

11. The combination set forth in claim 6 said flow control valve being controlled to increase the flow of injection liquid in response to a decrease in the magnitude of said pressure signal, and to decrease the flow of injection liquid in response to an increase in the magnitude of said pressure signal;

and said differential pressure controller acting to decrease said pressure signal in response to a decrease in pressure detected by said second pressure sensor relative to the pressure detected by said first pressure sensor, and said controller acting to increase said pressure signal in response to an increase in the pressure detected by said second pressure sensor relative to the pressure detected by said first pressure sensor.

References Cited

UNITED STATES PATENTS

| | | | |
|---|---|---|---|
| 3,176,996 | 4/1965 | Barnett | 277—3 X |
| 3,297,329 | 1/1967 | Smith et al. | 277—3 |
| 3,377,073 | 4/1968 | Harney | 277—27 |
| 3,392,983 | 7/1968 | Hajner | 277—28 |

SAMUEL ROTHBERG, Primary Examiner

U.S. Cl. X.R.

277—28, 15